(12) United States Patent
Murgatroyd et al.

(10) Patent No.: US 8,906,116 B2
(45) Date of Patent: Dec. 9, 2014

(54) MIXTURES OF DISPERSE DYES

(75) Inventors: Adrian Murgatroyd, Frankfurt am Main (DE); Clemens Grund, Hattersheim (DE); Klaus-Wilfried Wanken, Lverkusen (DE); Hartwig Jordan, Bergisch-Gladbach (DE)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 13/361,175

(22) Filed: Jan. 30, 2012

(65) Prior Publication Data

US 2012/0240346 A1    Sep. 27, 2012

Related U.S. Application Data

(63) Continuation of application No. 13/133,729, filed as application No. PCT/EP2009/065898 on Nov. 26, 2009, now abandoned.

(30) Foreign Application Priority Data

Dec. 11, 2008  (DE) .................. 10 2008 054 531

(51) Int. Cl.
| | | |
|---|---|---|
| D06P 5/30 | (2006.01) | |
| D06P 3/54 | (2006.01) | |
| D06P 3/48 | (2006.01) | |
| D06P 3/42 | (2006.01) | |
| C09B 67/36 | (2006.01) | |
| C09B 67/38 | (2006.01) | |
| C09D 11/00 | (2014.01) | |
| C09B 67/22 | (2006.01) | |
| C09D 11/328 | (2014.01) | |

(52) U.S. Cl.
CPC .......... *C09D 11/328* (2013.01); *C09B 67/0051* (2013.01); *Y10S 8/921* (2013.01); *Y10S 8/922* (2013.01); *Y10S 8/924* (2013.01)
USPC ............... 8/639; 8/636; 8/638; 8/662; 8/670; 8/696; 8/921; 8/922; 8/924; 106/31.13; 106/31.27; 347/1

(58) Field of Classification Search
USPC ............ 8/636, 639, 662, 670, 638, 666, 696, 8/921, 922, 924; 106/31.27, 31.13; 347/1
See application file for complete search history.

(56) References Cited

U.S. PATENT DOCUMENTS

| | | | |
|---|---|---|---|
| 3,905,951 A | | 9/1975 | Berrie et al. |
| 4,029,469 A | * | 6/1977 | Boyd et al. ............. 8/693 |
| 5,935,274 A | * | 8/1999 | Schaetzer ............. 8/639 |
| 6,348,939 B1 | * | 2/2002 | Xu et al. ............. 347/213 |

FOREIGN PATENT DOCUMENTS

| | | |
|---|---|---|
| DE | 1932806 A1 | 2/1970 |
| DE | 2548052 A1 | 5/1976 |
| DE | 10004071 A1 | 8/2000 |
| EP | 0330967 A2 | 9/1989 |
| GB | 2346150 A | 8/2000 |
| JP | 7331104 A | 12/1995 |
| JP | 10077583 A | 3/1998 |
| WO | WO-2004/056925 A1 | 7/2004 |
| WO | WO-2006/072560 A2 | 7/2006 |

* cited by examiner

*Primary Examiner* — Lorna M Douyon
*Assistant Examiner* — Amina Khan
(74) *Attorney, Agent, or Firm* — Drinker Biddle & Reath LLP

(57) ABSTRACT

The present invention relates to dye mixtures which comprise at least one dye of the formula (I)

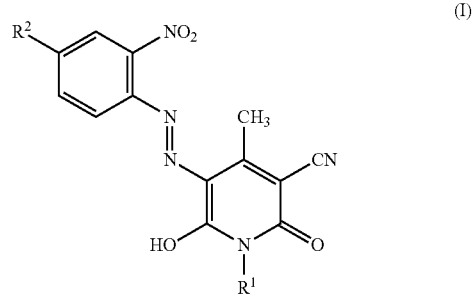

and at least one dye of the formula (II)

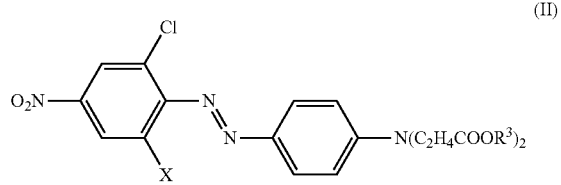

in which $R^1$, $R^2$, $R^3$, and X are defined as stated in claim 1, to processes for their preparation, and to their use.

16 Claims, No Drawings

MIXTURES OF DISPERSE DYES

CROSS-REFERENCE TO RELATED APPLICATIONS

This application is a Continuation Application of U.S. application Ser. No. 13/133,729 filed Jun. 9, 2011, now abandoned, which is incorporated by reference. U.S. application Ser. No. 13/133,729 is a national stage application (under 35 U.S.C. §371) of PCT/EP2009/065898, filed Nov. 26, 2009, which claims benefit of German application 10 2008 054 531.7, filed Dec. 11, 2008.

BACKGROUND OF THE INVENTION

The present invention is situated within the field of disperse dyes for the dyeing of hydrophobic textile materials.

JP 7-331104 and JP 10-077583 have already disclosed mixtures of disperse phenylazo dyes with disperse pyridoneazo dyes.

BRIEF SUMMARY OF THE INVENTION

It has now been found that the mixtures described below, in comparison to the known mixtures, feature improved wash and contact fastness properties as polyester dyeings and especially as polyester-elastane dyeings. Further improvement can be obtained with the mixtures described in the context of the buildup of the dyeings on polyester and polyester-elastane materials.

The present invention provides a dye mixture which comprises at least one dye of the formula (I)

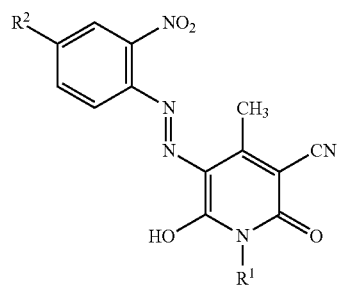

(I)

in which
$R^1$ is $(C_1-C_4)$-alkyl or $(C_1-C_4)$-alkoxy-$(C_1-C_4)$-alkyl; and
$R^2$ is $(C_1-C_4)$-alkoxy;
and at least one dye of the formula (II)

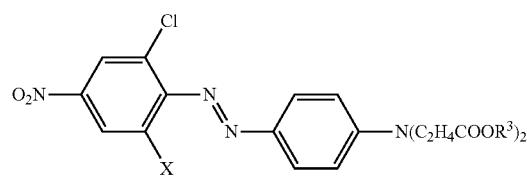

(II)

in which
X is chloro or bromo; and
$R^3$ is $(C_1-C_4)$-alkyl.

$(C_1-C_4)$-Alkyl groups may be linear or branched and are for example methyl, ethyl, n-propyl, isopropyl, n-butyl, isobutyl or tert-butyl. Methyl and ethyl are preferred. Similar comments apply to $(C_1-C_4)$-alkoxy groups, and so methoxy and ethoxy are preferred.

Examples of $(C_1-C_4)$-alkoxy-$(C_1-C_4)$-alkyl are methoxymethyl, ethoxymethyl, ethoxyethyl, methoxyethyl, and isopropoxypropyl.

With particular preference $R^1$ is ethyl, $R^2$ is methoxy, and $R^3$ is methyl.

X is preferably bromo.

DETAILED DESCRIPTION OF THE INVENTION

Preferred dye mixtures comprise the dyes of the formulae (I) and (II) in amounts each of 1% to 99% by weight, more preferably in amounts each of 20% to 80% by weight. Very preferred dye mixtures comprise the dye of the formula (I) in amounts of 30% to 45% by weight and the dye of the formula (II) in amounts of 55% to 70% by weight.

In one preferred embodiment the dye mixtures of the invention comprise no dyes other than the dyes of the formulae (I) and (II), or comprise other dyes only in amounts of up to 2% by weight, more particularly 0.01% to 2% by weight.

The dye mixtures of the invention can be prepared by mechanically mixing the dyes of the formulae (I) and (II). In that case the amounts are selected more particularly so as to give mixtures with desired compositions.

The dyes of the formula (I) are known and described for example in DE 1932806. The dyes of the formula (II) are known as well and described for example in DE 2548052.

The dye mixtures of the invention are outstandingly suitable for dyeing and printing hydrophobic materials, the dyeings and prints obtained being notable for level hues and high service fastnesses. Notable features include good wash and contact fastnesses, and also excellent color buildup properties, especially on polyester and polyester-elastane materials.

Accordingly the present invention also provides for the use of the dye mixtures of the invention for dyeing and printing hydrophobic materials, and provides methods of dyeing or printing such materials in conventional procedures, in which a dye mixture of the invention is employed as colorant.

The aforementioned hydrophobic materials may be of synthetic or semisynthetic origin. Suitable materials include, for example, secondary cellulose acetate, cellulose triacetate, polyamides, polylactides, and, in particular, high molecular mass polyesters. Materials made of high molecular mass polyester are more particularly those based on polyethylene terephthalates or polytrimethylene terephthalates. Also contemplated are blend fabrics and blend fibers such as polyester-cotton or polyester-elastane, for example. The hydrophobic synthetic materials may take the form of films or sheet- or threadlike constructions and may have been processed, for example, into yarns or into woven or knitted textile materials. Preference is given to fibrous textile materials, which may also be present in the form of microfibers, for example.

Dyeing in accordance with the use provided by the invention may take place in conventional manner, preferably from aqueous dispersion, optionally in the presence of carriers, at between 80 to about 110° C. by the exhaust process or by the HT process in a dyeing autoclave at 110 to 140° C., and also by the so-called thermofix process, in which the fabric is padded with the dyeing liquor and subsequently fixed at about 180 to 230° C.

Printing of the aforementioned materials may be carried out in a manner known per se by incorporating the dye mixtures of the invention in a print paste and treating the fabric printed therewith to fix the dye, optionally in the presence of a carrier, at temperatures between 180 to 230° C., with HT steam, pressurized steam or dry heat.

For use in dyeing liquors, padding liquors or print pastes, the dye mixtures of the invention are to be in a very fine state of subdivision. Fine subdivision of the dyes is accomplished in a manner known per se by slurrying them together with dispersants in a liquid medium, preferably water, and subjecting the mixture to the action of shearing forces, the dye particles originally present being mechanically comminuted to an extent such that an optimum specific surface area is attained and the sedimentation of the dye is extremely low. This is done in suitable mills, such as ball or sand mills. The particle size of the dyes is generally between 0.1 and 5 μm, preferably about 1 μm.

The dispersants which are used in the milling operation may be nonionic or anionic. Nonionic dispersants are, for example, reaction products of alkylene oxides, such as ethylene oxide or propylene oxide, with alkylatable compounds, such as fatty alcohols, fatty amines, fatty acids, phenols, alcohol phenols, and carboxamides, for example. Anionic dispersants are, for example, lignosulfonates, alkyl- or alkylarylsulfonates or alkylaryl polyglycol ether sulfates.

For the majority of applications the dye preparations obtained in this way are to be pourable. In these cases, therefore, there are limits on the dye content and dispersant content. Generally speaking, the dispersions are adjusted to a dye content of up to 50 percent by weight and a dispersant content of up to about 25 percent by weight. For economic reasons, dye contents are usually not below 15 percent by weight.

The dispersions may also comprise other auxiliaries as well, examples being those which act as oxidizing agents, such as sodium m-nitrobenzenesulfonate, for example, or fungicidal agents, such as sodium o-phenylphenoxide and sodium pentachlorophenoxide, for example, and more particularly what are known as "acid donors", such as butyrolactone, monochloroacetamide, sodium chloroacetate, sodium dichloroacetate, the Na-salt of 3-chloropropionic acid, monoesters of sulfuric acid such as lauryl sulfate, for example, and also sulfuric esters of ethoxylated and propoxylated alcohols, such as butylglycol sulfate, for example.

The dye dispersions obtained in this way can be used with great advantage for making up dyeing liquors and print pastes.

There are certain fields of use where powder formulations are preferred. These powders comprise the dye, dispersants, and other auxiliaries, such as wetting, oxidizing, preserving, and dust proofing agents, for example, and the abovementioned "acid donors".

One preferred method of producing dye preparations in powder form involves stripping the liquid from the liquid dye dispersions described above, by means, for example, of vacuum drying, freeze drying, or by drying on drum dryers, but preferably by spray drying.

The dyeing liquors are produced by diluting the required amounts of the above-described dye formulations with the dyeing medium, preferably with water, to an extent such as to give a liquor ratio of 5:1 to 50:1 for dyeing. Additionally the liquors are generally admixed with further dyeing auxiliaries, such as dispersants, wetting agents, and fixing auxiliaries. Organic and inorganic acids such as acetic acid, succinic acid, boric acid or phosphoric acid are added to set a pH of 4 to 5, preferably 4.5. It is advantageous to buffer the pH which has been set and to add a sufficient amount of a buffer system. One advantageous buffer system, for example, is the acetic acid/sodium acetate system.

Where the dye mixture is to be used in textile printing, the required amounts of the abovementioned dye formulations are kneaded in conventional manner together with thickeners, such as alkali metal alginates or the like, for example, and, optionally, with further adjuvants, such as fixation accelerants, wetting agents, and oxidizing agents, for example, to form print pastes.

The present invention also provides inks for digital textile printing by the ink jet process, which comprise a dye mixture of the invention.

The inks of the invention are preferably aqueous and comprise dye mixtures of the invention in amounts, for example, of 0.1% to 50% by weight, preferably in amounts of 1% to 30% by weight, and more preferably in amounts of 1% to 15% by weight, based on the total weight of the ink. In addition they comprise in particular from 0.1% to 20% by weight of a dispersant. Suitable dispersants are known to a person skilled in the art, are available commercially, and include, for example, sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes, and reaction products of alkylene oxides with alkylatable compounds, such as fatty alcohols, fatty amines, fatty acids, carboxamides, and unsubstituted or substituted phenols, for example.

The inks of the invention may further comprise the usual additives, examples being viscosity moderators to set viscosities in the range from 1.5 to 40.0 mPas in a temperature range from 20 to 50° C. Preferred inks have a viscosity of 1.5 to 20 mPas, and particularly preferred inks a viscosity of 1.5 to 15 mPas.

Suitable viscosity moderators include rheological additives, such as polyvinylcaprolactam, polyvinylpyrrolidone, and their copolymers, polyether polyol, associative thickeners, polyurea, sodium alginates, modified galactomannans, polyetherurea, polyurethane, and nonionic cellulose ethers, for example.

As further additions the inks of the invention may include surface-active substances to set surface tensions of 20 to 65 mN/m, which are adapted if appropriate as a function of the process used (thermal or piezo technology).

Examples of suitable surface-active substances include all kinds of surfactants, preferably nonionic surfactants, butyldiglycol, and 1,2-hexanediol.

The inks may further comprise customary adjuvants, such as substances for inhibiting fungal and bacterial growth, for example, in amounts of 0.01% to 1% by weight, based on the total weight of the ink.

The inks of the invention may be prepared in conventional manner by mixing of the components in water.

Example 1 a) 38.7 parts of the dye (Ia)

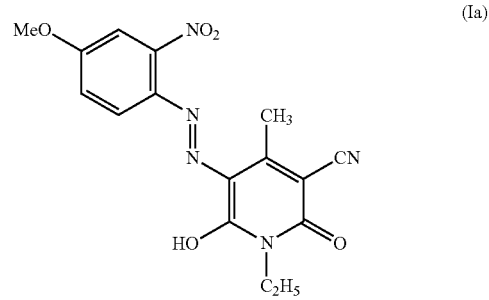 [SMILES: CCn1c(O)c(/N=N/c2ccc(OC)cc2[N+](=O)[O-])c(C)c(C#N)c1=O]

and 61.3 parts of the dye (IIa)

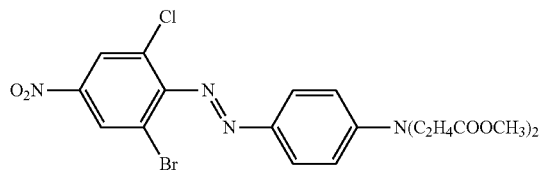

in the form of the water-moist presscakes are admixed in 150 ml of water with 70 g of a lignosulfonate, Na salt, and adjusted with sulfuric acid to a pH of 6 to 8. This is followed by grinding in a bead mill to a particle size (diameter) of 0.1-5 micrometers. This dispersion is standardized with a further 65 g of a lignosulfonate and dried in a spray dryer.

b) 2 g of the dye mixture obtained in a) is dispersed at 40-50° C. in 100 ml of water. A dyebath is prepared from 11.5 nil of this aqueous dispersion, 57.5 ml of deionized water, and 1.2 ml of buffer solution (pH 4.5), and is entered with a 5 g portion of polyester. After heating to 130° C., it is held at 130° C. in a Werner Mathis high-temperature dyeing machine for 45 minutes. After rinsing with water and a reductive afterclear, the polyester material is dyed in a yellow-brown hue with excellent wash fastnesses. One particularly interesting property of this mixture is the excellent buildup on polyester and polyester-microfiber. On polyester-microfiber, proportionally more of the mixture has to be used than on conventional polyester, to achieve a comparable color strength.

Example 2

38.7 parts of the dye (Ib)

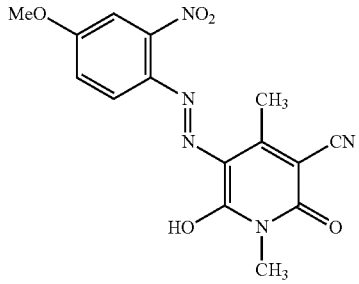

and 61.3 parts of the dye (IIa)

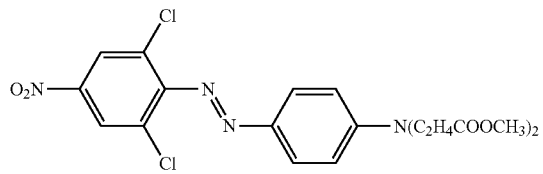

in the form of the water-moist presscakes are admixed in 150 ml of water with 70 g of a dispersant based on a condensation product of sodium naphthalenesulfonate and formaldehyde, and adjusted with sulfuric acid to a pH of 6 to 8. This is followed by grinding in a bead mill to a particle size (diameter) of 0.1-5 micrometers. This dispersion is standardized with a further 65 g of a dispersant based on a condensation product of sodium naphthalenesulfonate and formaldehyde, and dried in a spray drier.

The dye mixture obtained in this way can be used for dyeing by the method specified in example 1b).

In the same way as in examples 1 and 2 it is also possible to obtain the following mixtures and dye polyesters.

| Example | $R^1$ | $R^2$ | $R^3$ | X | Dye (I):(II) mixing ratio |
|---|---|---|---|---|---|
| 3 | Methoxymethyl | Methoxy | Methyl | Cl | 30:70 |
| 4 | Ethyl | Ethoxy | Ethyl | Cl | 45:55 |
| 5 | n-Propyl | Methoxy | Methyl | Br | 20:80 |
| 6 | Ethyl | Methoxy | n-Propyl | Cl | 40:60 |
| 7 | n-Propyl | Ethoxy | Ethyl | Br | 75:25 |
| 8 | Methyl | n-Propoxy | Methyl | Br | 80:20 |
| 9 | n-Butyl | Methoxy | Methyl | Br | 65:35 |
| 10 | Ethyl | n-Butoxy | Ethyl | Cl | 35:65 |
| 11 | Ethyl | Methoxy | n-Butyl | Cl | 45:55 |
| 12 | 2-Ethylhexyl | Methoxy | Methyl | Cl | 37:63 |
| 13 | Isopropoxypropyl | Methoxy | Methyl | Br | 39:61 |
| 14 | Ethyl | Methoxy | Methyl | Br | 40:60 |
| 15 | Ethyl | Methoxy | Methyl | Cl | 39:61 |
| 16 | Isopropoxypropyl | Methoxy | Methyl | Cl | 38:62 |
| 17 | 2-Ethylhexyl | Methoxy | Methyl | Br | 35:65 |
| 18 | Isopropoxypropyl | Ethoxy | Methyl | Br | 20:80 |
| 19 | n-Butyl | Ethoxy | Methyl | Br | 55:45 |
| 20 | Isopropoxypropyl | Methoxy | Ethyl | Cl | 37:63 |
| 21 | 2-Ethylhexyl | Ethoxy | Methyl | Cl | 34:66 |
| 22 | n-Butyl | Methoxy | Methyl | Cl | 38:62 |
| 23 | 2-Ethoxyhexyl | Ethoxy | Methyl | Br | 33:67 |
| 24 | n-Propyl | Methoxy | Methyl | Cl | 55:45 |

Example 25

A textile fabric comprising polyester is padded with a liquor comprising 50 g/l of an 8% strength sodium alginate solution, 100 g/l of an 8-12% strength carob flour ether solution and 5 g/l of monosodium phosphate in water, and then dried. The wet pickup is 70%.

The textile thus pretreated is printed with an aqueous ink prepared in accordance with the procedure described above and containing 3.5% of the dye mixture of example 1, 2.5% of Disperbyk 190 dispersant, 30% of 1,5-pentanediol, 5% of diethylene glycol monomethyl ether, 0.01% of Mergal K9N biocide, and 58.99% of water, using a drop-on-demand (piezo) ink jet print head. The print is dried completely. Fixing takes place by means of superheated steam at 175° C. for 7 minutes. Thereafter the print is subjected to an alkaline reductive afterclear, rinsed warm, and then dried.

What is claimed is:

1. A dye mixture which consists of at least one dye of the formula (I)

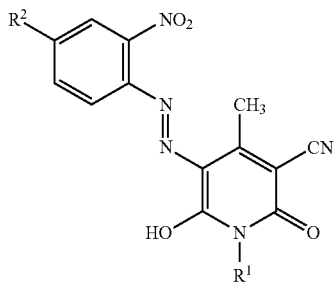 (I)

in which
R$^1$ is (C$_1$-C$_4$)-alkyl or (C$_1$-C$_4$)-alkoxy-(C$_1$-C$_4$)-alkyl; and
R$^2$ is (C$_1$-C$_4$)-alkoxy;
and at least one dye of the formula (II)

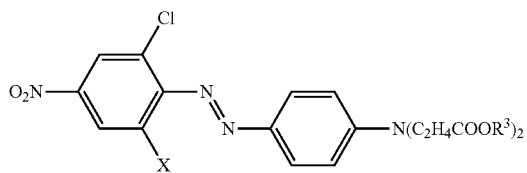 (II)

in which
X is chloro or bromo; and
R$^3$ is (C$_1$-C$_4$)-alkyl and
wherein the dyes of the formulae (I) and (II) are present in amounts each of 20% to 80% by weight.

2. The dye mixture as claimed in claim 1, wherein R$^1$ is ethyl, R$^2$ is methoxy, and R$^3$ is methyl.

3. The dye mixture as claimed in claim 2, wherein X is bromo.

4. The dye mixture as claimed in claim 3, wherein the dyes of the formula (I) are present in amounts of 30% to 45% by weight and the dyes of the formula (II) are present in amounts of 55% to 70% by weight.

5. The dye mixture as claimed in claim 3, wherein the dyes of the formula (I) are present in amounts of 38.7% by weight and the dyes of the formula (II) are present in amounts of 61.3% by weight.

6. The dye mixture as claimed in claim 1, wherein X is bromo.

7. The dye mixture as claimed in claim 1, wherein the dyes of the formula (I) are present in amounts of 30% to 45% by weight and the dyes of the formula (II) are present in amounts of 55% to 70% by weight.

8. The dye mixture as claimed in claim 1, wherein the dyes of the formula (I) are present in amounts of 38.7% by weight and the dyes of the formula (II) are present in amounts of 61.3% by weight.

9. A process for preparing the dye mixture as claimed in claim 1 which comprises mechanically mixing the dyes of the formulae (I) and (II).

10. A process for dyeing or printing a hydrophobic material which comprises contacting the material with the dye mixture as claimed in claim 1.

11. The process as claimed in claim 10, wherein the process is for digital printing by an ink jet process.

12. The process as claimed in claim 11, wherein the material is a textile material.

13. A process for preparing the dye mixture as claimed in claim 3 which comprises mechanically mixing the dyes of the formulae (I) and (II).

14. A process for dyeing or printing a hydrophobic material which comprises contacting the material with the dye mixture as claimed in claim 3.

15. The process as claimed in claim 14, wherein the process is for digital printing by an ink jet process.

16. The process as claimed in claim 15, wherein the material is a textile material.

* * * * *